United States Patent
Yoder et al.

(10) Patent No.: US 12,508,900 B2
(45) Date of Patent: Dec. 30, 2025

(54) LATCHED MONO-STABLE AXIAL COUPLING

(71) Applicant: WARN Automotive, LLC, Milwaukie, OR (US)

(72) Inventors: Bryan Yoder, Corvallis, OR (US); Bryce Gould, Vancouver, WA (US); Russell Conine, Portland, OR (US)

(73) Assignee: WARN Automotive, LLC, Milwaukie, OR (US)

( * ) Notice: Subject to any disclaimer, the term of this patent is extended or adjusted under 35 U.S.C. 154(b) by 41 days.

(21) Appl. No.: 18/472,076

(22) Filed: Sep. 21, 2023

(65) Prior Publication Data

US 2024/0100944 A1  Mar. 28, 2024

Related U.S. Application Data (60) Provisional application No. 63/409,054, filed on Sep. 22, 2022.

(51) Int. Cl.
*B60K 23/08* (2006.01)
*F16H 63/32* (2006.01)

(52) U.S. Cl.
CPC ............. *B60K 23/08* (2013.01); *F16H 63/32* (2013.01); *B60K 2023/0883* (2013.01)

(58) Field of Classification Search
CPC .............. F16D 2011/006; B60K 23/08; B60K 2023/088; F16H 63/32
See application file for complete search history.

(56) References Cited

U.S. PATENT DOCUMENTS

| | | |
|---|---|---|
| 6,082,514 A | 7/2000 | Averill |
| 8,696,510 B2 | 4/2014 | Arai |
| 9,010,511 B2 | 4/2015 | Eastman |
| 9,383,008 B2 | 7/2016 | Anderson et al. |
| 9,657,837 B2 * | 5/2017 | Showalter ............ F16H 63/304 |
| 9,764,638 B1 | 9/2017 | Wilson |
| 9,784,321 B2 | 10/2017 | Pritchard |
| 9,845,834 B2 | 12/2017 | Kohlbock et al. |
| 10,245,950 B2 | 4/2019 | Shimizu et al. |
| 10,293,687 B2 | 5/2019 | Nozu et al. |
| 10,535,458 B2 | 1/2020 | Heravi et al. |
| 10,654,360 B2 | 5/2020 | Niimi et al. |

(Continued)

FOREIGN PATENT DOCUMENTS

| | | |
|---|---|---|
| CN | 112392933 | 2/2023 |
| JP | 2015145153 | 8/2015 |

(Continued)

*Primary Examiner* — Victor L MacArthur
(74) *Attorney, Agent, or Firm* — Fish & Richardson P.C.

(57) ABSTRACT

The present disclosure describes an apparatus, and method of operation for an axial coupling that includes a shift linkage having a first end and a second end, the shift linkage configured to pivot between a first position and a second position. The axial coupling further includes a first solenoid affixed to the first end of the shift linkage, and actuating the first solenoid pivots the shift linkage between the first and second positions. A latch is configured to engage with the shift linkage retaining the shift linkage in the first position when engaged and a second solenoid positioned to contact the latch, that when energized, pivots the latch into and maintain the latch in an engaged position.

23 Claims, 6 Drawing Sheets

(56) References Cited

U.S. PATENT DOCUMENTS

| | | |
|---|---|---|
| 10,724,580 B2 | 7/2020 | Averill et al. |
| 10,801,556 B2 | 10/2020 | Eschenburg et al. |
| 10,844,913 B2 | 11/2020 | Boudreau et al. |
| 10,857,881 B2 | 12/2020 | Kumar |
| 10,955,013 B2 | 3/2021 | Yoder et al. |
| 10,968,986 B1 | 4/2021 | Sung et al. |
| 11,168,743 B2* | 11/2021 | Smith ............... B60K 17/02 |
| 11,390,160 B2 | 7/2022 | McBride et al. |
| 2022/0381340 A1 | 12/2022 | Pellmann et al. |
| 2025/0196630 A1 | 6/2025 | Yoder et al. |

FOREIGN PATENT DOCUMENTS

| | | |
|---|---|---|
| KR | 101791329 | 10/2017 |
| WO | WO 2022/104480 | 5/2022 |

* cited by examiner

LATCHED MONO-STABLE AXIAL COUPLING

CROSS-REFERENCE TO RELATED APPLICATION

This application claims priority under 35 U.S.C. § 119 to U.S. Application Ser. No. 63/409,054, filed on Sep. 22, 2022, the entire contents of which is hereby incorporated by reference.

TECHNICAL FIELD

This disclosure generally relates to wheel hubs that are actuable to couple and decouple the wheel hubs from a drive axle.

BACKGROUND

Some vehicles employ four-wheel drive systems to increase traction for off-road driving as well as low traction for on-road driving. However, it may be desirable to provide optional engagement/disengagement of the four-wheel drive system to increase the versatility of the vehicle. Specifically, two of the drive wheels may be disengaged to provide two-wheel drive during on-road driving to increase the vehicle's fuel and/or battery economy. On the other hand, four-wheel drive may be used to provide increased traction during certain driving conditions, such as vehicle operation on dirt roads, snow, etc. In this way, a user may adjust a vehicle's drivetrain based on the driving circumstances and the desired vehicle performance characteristics.

Engagement of four-wheel drive systems may be automatically activated or manually activated. Although automatic four-wheel drive engagement has a number of benefits, such as decreased user interaction, automatic four-wheel drive engagement systems also may have some drawbacks, such as greater manufacturing costs as well as repair and maintenance costs. On the other hand, manually engaged four-wheel drive systems have certain benefits over automatically engaged systems, such as increased reliability and decreased manufacturing and repair costs. Therefore, manual four-wheel drive systems may be desired by users who prefer less complex and more reliable four-wheel drive systems, such as off-road enthusiasts.

SUMMARY

In general, the disclosure involves an axial coupling and methods of operation. The axial coupling includes a shift linkage that has a first end and a second end, and is configured to pivot between a first position and a second position. The axial coupling further includes a first solenoid affixed to the first end of the shift linkage, and actuating the first solenoid pivots the shift linkage between the first and second position. A latch configured to engage with the shift linkage is included in the axial coupling, the latch retaining the shift linkage in the first position when engaged. The axial coupling also includes a second solenoid positioned to contact the latch, the second solenoid, when energized, pivots the latch into and maintains the latch in an engaged position.

Implementations can optionally include one or more of the following features.

In some implementations, the latch is biased to a disengaged position. In some implementations, the latch is spring biased or magnetically biased.

In some implementations, the first solenoid is affixed to the first end of the shift linkage by a rocker linkage. Movement of a plunger of the first solenoids in a first direction causes the rocker linkage to pivot about a pivot point and move a strut that is coupled to the shift linkage in a second direction.

In some implementations, the shift linkage is a forked linkage, and the first end is a control end and the second end is a forked end. When the shift linkage pivots, the forked end translates a spline coupling, and the spline coupling causes the axial coupling to engage when the shift linkage is in the second position, and to disengage when the shift linkage is in the first position.

In some implementations, the latch includes a roller that reduces friction between the latch and the shift linkage.

In some implementations, a housing encloses the shift linkage, the first solenoid, the latch, and the second solenoid. In some implementations, the first and second solenoid are thermally coupled to the housing, and heat generated by the solenoids is transmitted into the housing.

A method for operating the axial coupling can include applying a pivoting moment to a shift linkage, thereby urging the shift linkage toward an engaged position, removing a holding force from a latch, thereby allowing the latch to move, under a bias force, to an unlatched position, and removing the pivoting moment from the shift linkage allowing the shift linkage to pivot into a disengaged position.

In some implementations, the shift linkage is biased to pivot toward the disengaged position. In some implementations the shift linkage is spring or magnetically biased.

In some implementations, applying a pivoting moment to the shift linkage toward the engaged position reduces a pressure between the latch and the shift linkage.

Implementations can include one or more of the following advantages. Simplified operation is enabled using solenoid actuation, removing the need for vacuum tubes and a vacuum system present in conventional systems. Additionally, the implementation of a latching mechanism permits low energy consumption while maintaining the ability to automatically disconnect in the event of an electrical power loss.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

In general, this disclosure relates to wheel hub disconnects

DETAILED DESCRIPTION

This disclosure describes a system and method for coupling and decoupling a wheel hub from a vehicle axle using a solenoid actuated axial coupling. The axial coupling can include a spline coupling, which engages the wheel hub to the axle by translating or sliding between two positions (an engaged position and a disengaged position). A shift fork linkage can be used to mechanically slide the spline coupling between positions, and that shift fork linkage can be actuated using a shift solenoid. In some implementations, the shift fork linkage is constructed with a mono-stable design, that is, it is biased toward a single position (e.g., the disengaged position). For example, a shift spring can bias the shift fork to cause the spline coupling to disengage absent an additional force overcoming the shift spring. A shift solenoid can be used as the additional force, actuating a plunger and overcoming the shift spring. In this example, when the shift solenoid is energized, the plunger can apply force to the shift fork linkage, and maintain the axial coupler in an engaged condition. Once the shift solenoid is de-energized, the shift spring will return the shift fork linkage to the disengaged position, decoupling the axial coupler. This configuration is advantageous in that upon loss of electrical power to a vehicle or system using the axial coupler, the coupler will automatically disengage. In some implementations, the spring bias and shift solenoid operation can be reversed, resulting in a coupler that will automatically engage upon loss of electrical power.

In the above example, the shift solenoid needs to apply a relatively large force in order to cause a shifting operation in the axial coupler. Much less force is needed, however, in order to maintain the shift fork linkage in the engaged position. Therefore, a second, hold solenoid can be used to engage a latch, mechanically locking the shift fork linkage in place, and allowing the shift solenoid to be de-energized. Since the force required to maintain the latch is significantly less, the hold solenoid can be much smaller, and draw much less steady state current, than the shift solenoid. This results in a coupler that requires a small power draw to stay engaged, and automatically disengages when power is lost. In some implementations, the opposite is true, and the axial coupler requires a small power draw to stay disengaged, automatically engaging if power is interrupted. In other words, the shift fork linkage can be a mono-stable and biased either toward an engaged position where the latch is used to maintain the shift fork linkage disengaged, or biased toward a disengaged position where the latch is used to maintain the shift fork linkage engaged.

In some implementations, instead of solenoids, a mono-stable axial coupler can be actuated using hydraulic pistons, or pneumatic pistons. In some implementations, a fully mechanical system (e.g., using no electronic components) is used, applying levers, springs, and pull cables, to replace the solenoids as motive components.

Figure 1:
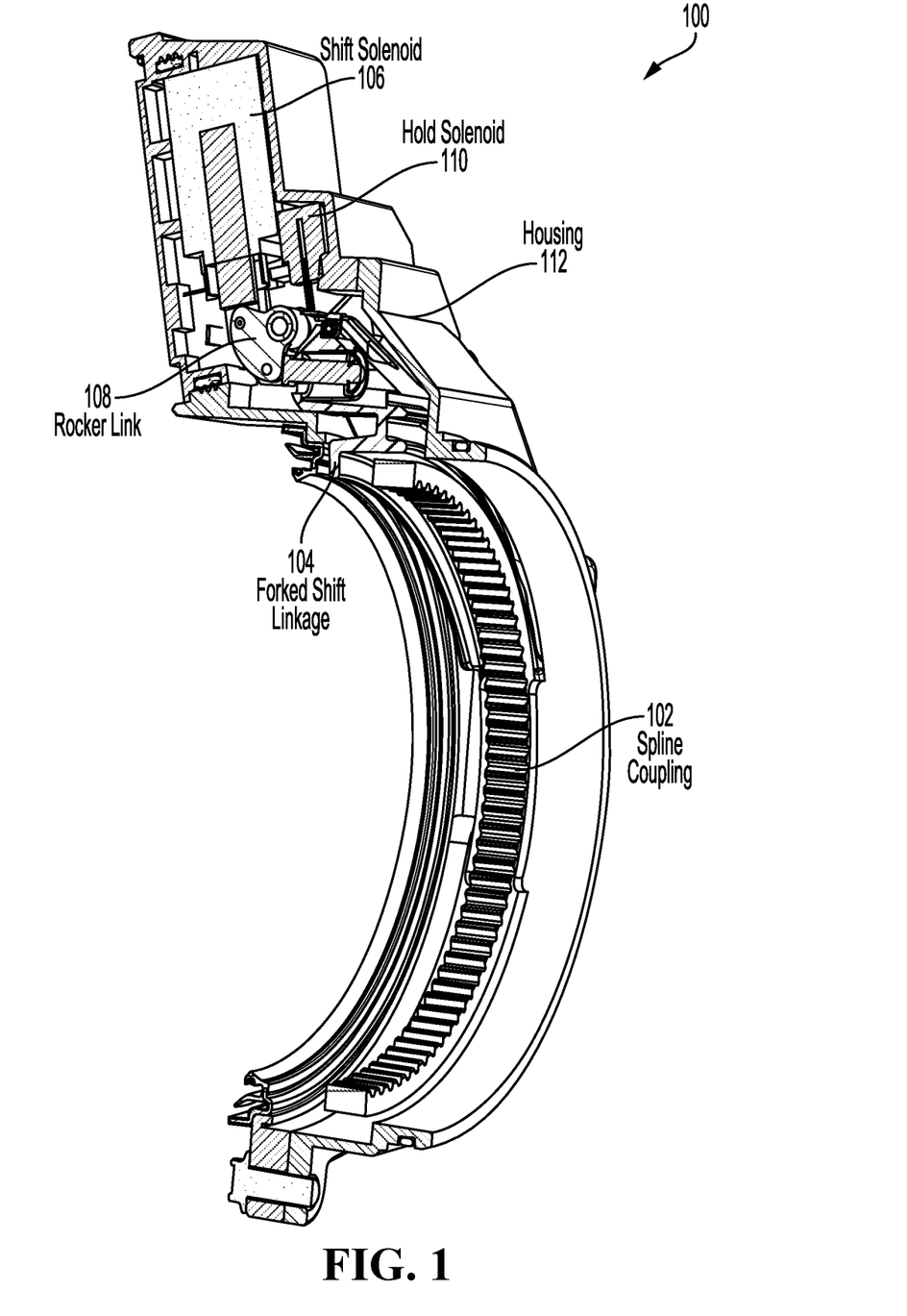
FIG. 1 is a perspective, cross-sectional view of a solenoid actuated axial coupling.

FIG. 1 is a perspective, cross-sectional view of a solenoid actuated axial coupling 100. The illustrated axial coupling 100 has many structural components removed for clarity of presentation. A spline coupling 102 provides selective engagement between two axles (e.g., a vehicle drive axle and a wheel hub). This is accomplished by axially moving the spline coupling 102 such that the spline coupling provides an interference coupling the vehicle drive axle and the wheel hub to rotate in unison. In instances where the axial coupling 100 decouples, for example, the wheel hub and the drive axle, the spline coupling 102 is axially translated such that the spline coupling 102 is only in contact with the drive axle or the wheel hub, not both.

A forked shift linkage 104 provides motive force to translate the spline coupling 102. The forked shift linkage 104 can be pivotably mounted to housing 112 or other component, such that it acts as a lever, where a force applied near the top of forked shift linkage 104 will cause the bottom (forked end) of the forked shift linkage 104 to apply axial force to the spline coupling 102. The forked shift linkage 104 and its engagement with the spline coupling 102 are described in further detail below with respect to FIG. 4.

A shift solenoid 106 can act on the top of the forked shift linkage 104 to cause it to pivot. In the illustrated example, a plunger of the shift solenoid 106 is connected to a rocker link 108 such that it can apply force to the forked shift linkage 104. For example, the plunger of the shift solenoid 106 can be connected to the rocker link 108 by a pin connection that permits some rotation of the rocker link 108 about the connection point. The rocker link 108 allows redirection of the movement or displacement of a plunger of shift solenoid 106 (e.g., from a substantially vertical direction to a substantially horizontal direction).

A hold solenoid 110 is positioned to hold the axial coupling 100 in an engaged (or disengaged position) and allow for the larger shift solenoid 106 to be de-energized. The hold solenoid 110 engages a biased latch and is discussed in further detail below with respect to FIG. 2.

Housing 112 can be a metal, plastic, fiberglass housing that functions to prevent dirt, debris, or foreign objects from entering the axial coupling 100. In some implementations, the housing forms a hermetic seal around axial coupling 100. In some implementations, the interior volume of the housing is nitrogen or argon purged, in order to reduce corrosion or moisture entrapment. In some implementations, the housing 112 is a thermally conductive material, such as aluminum, steel, bronze, an alloyed metal, or other material, and can be in thermal communication with shift solenoid 106 and hold solenoid 110. For example, in some implementations, the shift solenoid 106 and the hold solenoid 110 are mounted within recesses in the housing 112 using a thermal paste, heat conductive adhesive, or other material in order to conduct heat between the solenoids (110 and 106) and the housing 112. In some implementations, additional components (not shown) such as heat sinks or heat pipes, can be provided to enhance thermal transfer between the solenoids 110 and 106 and the housing 112.

Figure 2:
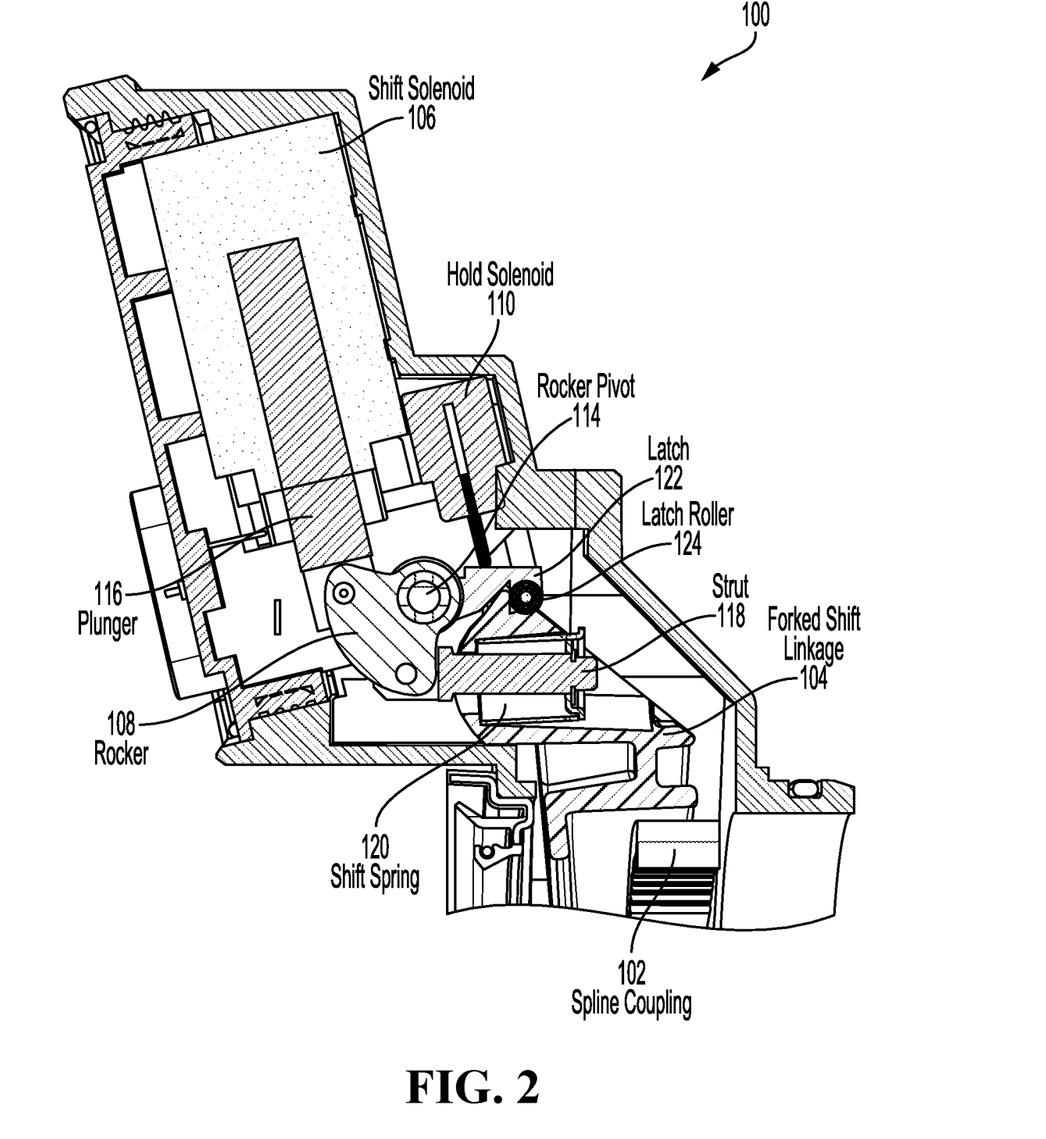
FIG. 2 is a side, cross-sectional view of an example solenoid actuated axial coupling.

FIG. 2 is a side, cross-sectional view of example axial coupling 100. Illustrated in FIG. 2 are details regarding the hold solenoid 110, latch 122, rocker 108 and its interactions between the shift solenoid 106 and the forked shift linkage 104. The hold solenoid 110, when energized, presses down on a latch 122. The latch 122 in the illustrated example is configured to engage the forked shift linkage 104 via latch roller 124. Latch roller 124 is a roller that reduces friction between the latch 122 and the forked shift linkage 104. This ensures that the latch 122 can disengage freely even if some tension or pressure exists between the latch 122 and the forked shift linkage 104. Additionally, the latch roller 124 reduces wear between the latch 122 and the forked shift linkage 104 during latching and unlatching operations.

Latch 122 can be configured to pivot, rotating about a pivot point in order to release the forked shift linkage 104 and cause the axial coupler 100 to disconnect. In the illustrated example the latch 122 is pivotably secured by the rocker pivot 114, and biased in a counter-clockwise direction, such that when the hold solenoid 110 de-energizes, the latch will rotate counter-clockwise raising the latch roller 124 and allowing the forked shift linkage 104 to pivot clockwise via the shift spring 120. Latch 122 can be spring biased, e.g., with a torsion spring wrapped around the rocker pivot 114. In some implementations, latch 122 is magnetically biased. In some implementations, a plunger of the hold solenoid 110 merely abuts the latch 122, in some implementations it is directly affixed to the latch 122, and the hold solenoid provides motive force for both latching and unlatching movements. For example, a spring or magnet can cause a retracting force within the hold solenoid 110 when the solenoid is de-energized, causing the latch 122 to disengage.

The shift solenoid 106 actuates plunger 116 which is connected to rocker 108. For example, the plunger of the shift solenoid 106 can be connected to the rocker link 108 by a pin connection that permits some rotation of the rocker link 108 about the connection point. When energized the plunger 116 retracts into the shift solenoid 106, rotating the rocker 108 about the rocker pivot 114, and causing the strut 118 to translate (to the left in the illustrated example). The motion of the strut 118 overcomes a spring bias caused by shift spring 120 and applies a force to the top of forked shift linkage 104, causing the forked shift linkage 104 to pivot (counter-clockwise in the illustrated example). This will cause the axial coupler 100 to engage, or connect. Once the forked shift linkage 104 is pivoted, the hold solenoid can be energized, engaging the latch 122. With the latch engaged, the shift solenoid 106 can be de-energized, without the axial coupler 100 disengaging, as the hold solenoid 110 in combination with the latch 122 prevent the shift spring 120 from causing the forked shift linkage 104 to rotate and disengage.

In some implementations, shift spring 120 provides for decoupled motion between the forked shift linkage 104 and the plunger 116. For example, during engagement operations, where plunger 116 retracts, it can compress shift spring 120, applying a rotating force to the forked shift linkage 104, but the forked shift linkage 104 may not be able to engage because the splines of the spline coupling 102 are not aligned. In this situation, the shift spring 120 will compress to maintain the rotating force until the spline coupling 102 engages. This allows the latch 122 to engage, holding the shift spring 120 in a compressed state without the shift solenoid 106 being energized. Thus the shift solenoid 106, hold solenoid 110, and latch 122 can operate even when the spline coupling 102 is in a misaligned position and unable to engage. Thus the shift solenoid 106 need not maintain an energized state until the spline coupling 102 engages, as the latch 122 combined with the shift spring 120 can provide sufficient motive force once the spline coupling 102 is aligned (either via wheel hub, or axle rotation).

A sensor element (not illustrated), for example a Hall Effect sensor, magnetic reed switch, pressure sensor, etc., can be used to accurately identify when the spline coupling 102 shifts into the engaged position. This sensor can be used to identify when the coupling actuation is complete, and the axial coupler 100 is ready for power transmission.

Figure 3:
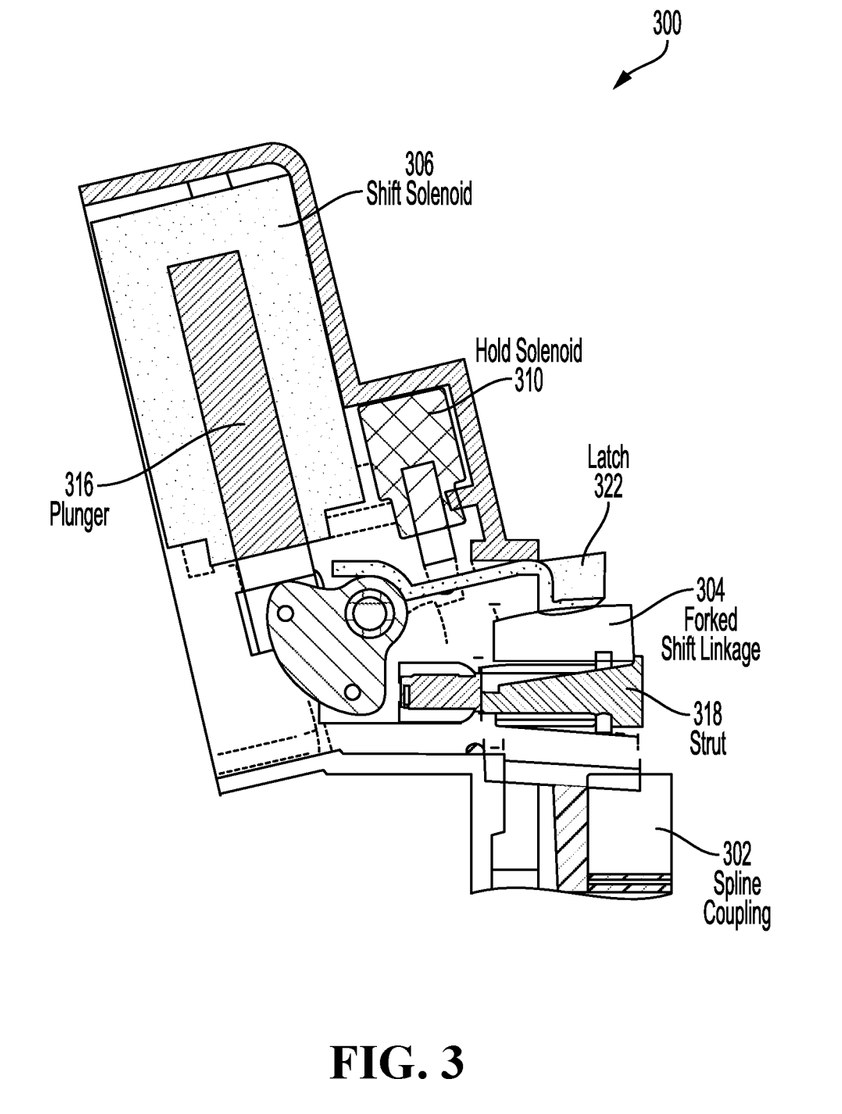
FIG. 3 is a side, cross-sectional view of an alternative example axial coupling.

FIG. 3 is a cross-sectional view of an alternative example axial coupling 300. Axial coupling 300 includes similar components as illustrated above, however has some different operating features. Axial coupler 300 is biased to engage upon full loss of power. For example, latch 322 does not include a roller, and instead frictionally engages with forked shift linkage 304. In the illustrated example, the plunger 316 extends from the shift solenoid 306 when the shift solenoid is energized, causing strut 318 to pivot the forked shift linkage 304 clockwise, disengaging (instead of engaging) the axial coupler 300. Hold solenoid 310 then engages latch 322 to prevent the forked shift linkage 304 from pivoting and engaging the axial coupler 300. Upon de-energizing of the hold solenoid 310, the latch 322 releases, and the spring or magnetically biased forked shift linkage 304 pivots counter-clockwise, translating spline coupling 302 and engaging axial coupler 300.

Figure 4:
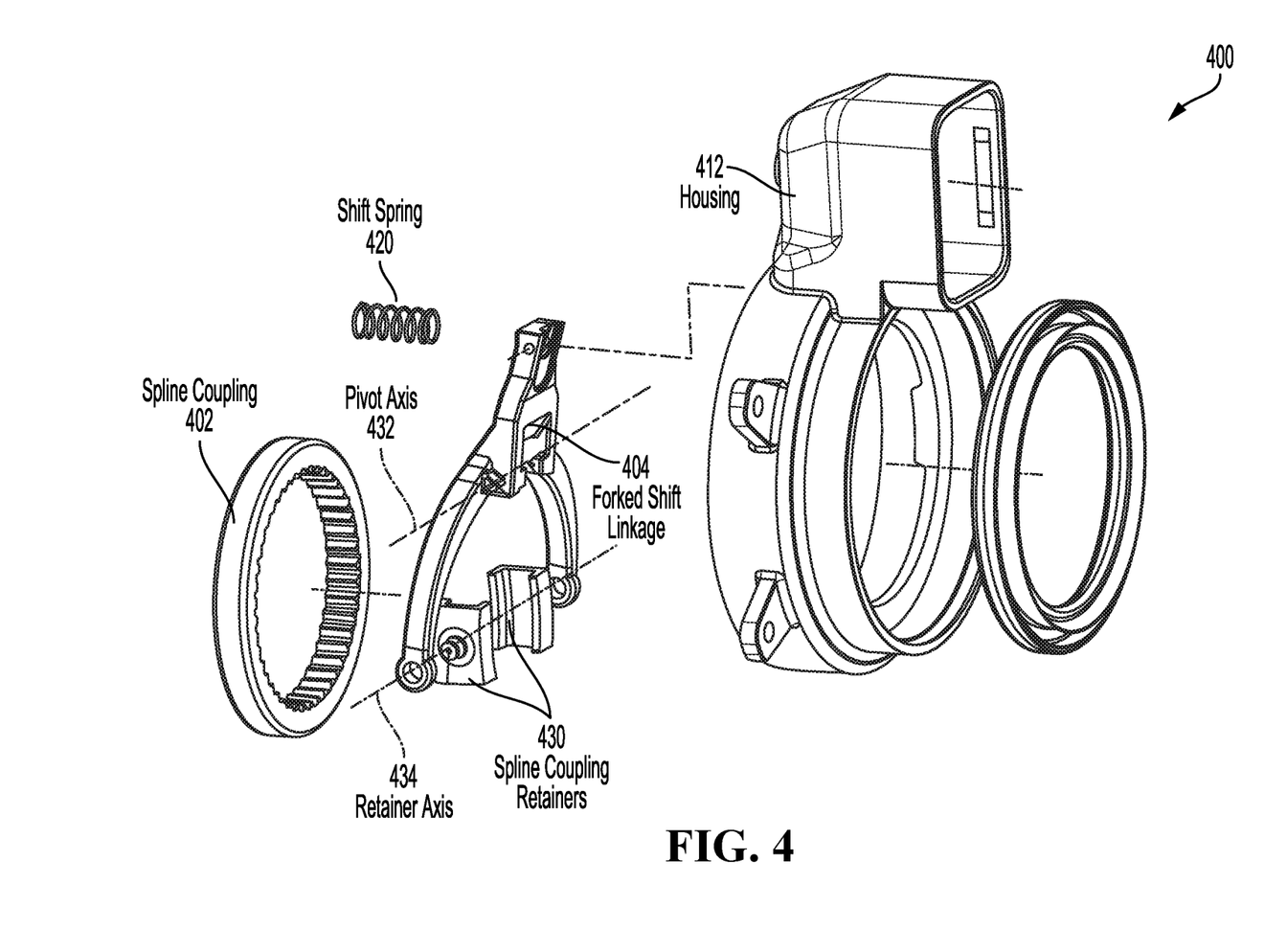
FIG. 4 is a planar exploded view of an example linkage system for an axial coupling

FIG. 4 is a planar exploded view of an example linkage system for an axial coupling 400. The forked shift linkage 404 is pivotably mounted within housing 412 such that it can pivot about pivot axis 432. The forked shift linkage 404 retains the spine coupling 402 using a pair of spline coupling retainers 430

Spline coupling retainers 430 are located at the forked end of forked shift linkage 404. The spline coupling retainers 430 are configured to retain the spline coupling 402. The spline coupling retainers 430 are configured to allow rotational movement along a retainer axis 434 parallel to the pivot axis 432 of the forked shift linkage 404. The spline coupling retainers 430 are configured to allow rotational movement along a second rotational axis defined by the circular center of the spline coupling 402. The spline coupling retainers 430 themselves include a trunnion mount configured to be received by receptacles at the forked end. Opposite the trunnion, each spline coupling retainer 430 defines a profile configured to receive and at least partially retain (as previously described) the spline coupling 402.

A shift spring 420 as illustrated can be similar to, or different from shift spring 120 as described with respect to FIG. 2, and can bias the forked shift linkage 404 in a particular direction, such as in the disengaged direction.

Figure 5:
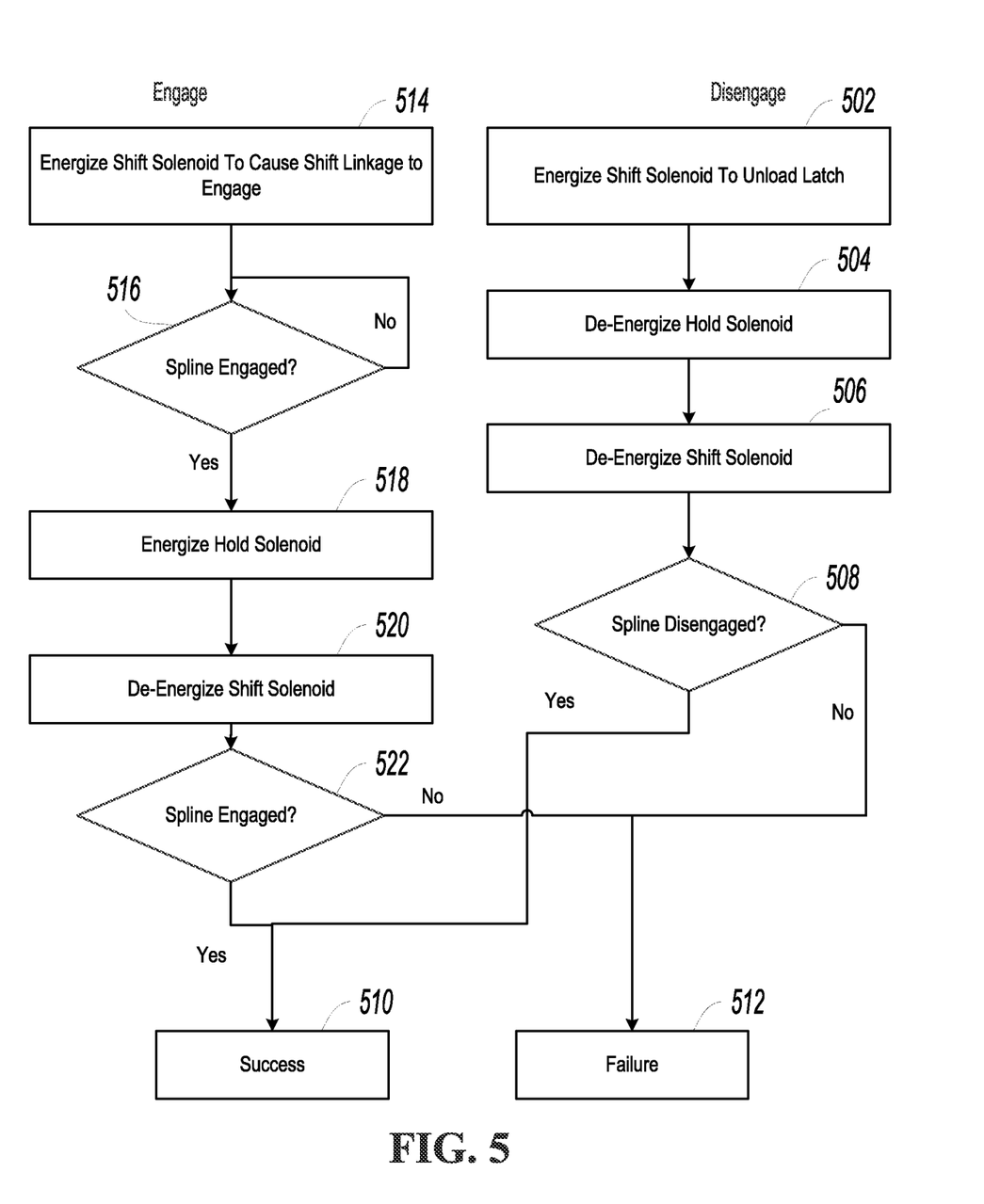
FIG. 5 is a flowchart illustrating an example process that can be used with aspects of this disclosure.

FIG. 5 is a flowchart illustrating an example process that can be used with aspects of this disclosure. Process 500 can proceed from 502, or 514, or both. In some implementations process 500 or portions thereof are performed automatically by a controller (e.g., controller 600 as described below with reference to FIG. 6). While process 500 is described in terms of the foregoing figures and descriptions (e.g., FIGS. 1, 2, and 4) it will be understood that process 500 can be applied to any suitable latched, mono-stable axial coupling.

During disengagement operations, a hold solenoid is energized, maintaining a shift linkage latched in an engaged position. In some implementations, there is significant pressure, or normal force between the shift linkage and the latch. A shift solenoid, used for transitions, is de-energized to minimize passive current draw. To initiate disengagement, process 500 proceeds to 502.

At 502, a pivoting moment is applied to the shifting linkage. For example, the shift solenoid is energized or a hydraulic/pneumatic piston is activated. This applies a pivoting moment to the shift linkage, and unloads the latch, reducing the normal force or pressure between the shift linkage and the latch. This reduces wear between the shift linkage and latch. Additionally, engaging the larger shift solenoid can add overall mass/inertia to the moving system during shifting operations, reducing accelerations and "slamming" in the axial coupling.

At 504, a hold force is removed from a hold latch. For example, the hold solenoid is de-energized or a hydraulic/pneumatic piston is activated to remove a hold force (e.g., the piston may be vented). This allows the latch, which is biased, to unlatch. The latch can be spring biased, magnet biased, or use some other form of bias (e.g., aerodynamic, gravity, vacuum, etc.).

At 506, with the latch disengaged, the pivoting moment is removed from the shifting linkage. For example, the shift solenoid is de-energized, allowing the shift linkage, which is also biased, to disengage the axial coupling. In some examples, a hydraulic/pneumatic piston is deactivated (e.g., vented) to remove the pivoting moment.

At 508, a determination is made whether a spline coupling, or the axial coupling as a whole has disengaged. This can be determined using, for example, a spline position sensor, a plunger/solenoid position sensor, rotation sensors (e.g., detecting a differential rotational speed between now uncoupled shafts) or other sensor. If the disengagement was successful, process 500 proceeds to 510.

At 510, a success message can be transmitted to one or more controllers or systems. In some implementations, at 510 no further action is taken and process 500 simply stops until an additional engage or disengage operation occurs.

Returning to 508, if it is determined the spline as not disengaged, process 500 proceeds to 512, where a failure message or signal can be transmitted. In some implementations, upon failure, process 500 repeats 502-508 in a second attempt to disengage. In some implementations, at 512, the entire system de-energizes. In some implementations, the hold solenoid is re-energized, and the shift solenoid is fired one or more times (e.g., repeatedly) in order to attempt to break friction between the spline the axle to which it is coupled.

During disengaged operation, the shift solenoid and the hold solenoid are both de-energized. The biased latch is in an unlatched position and the shift fork is in a disengaged position. In order to engage a disengaged axial coupling, process 500 begins at 514.

At 514, a pivoting moment is applied to the shifting linkage. For example, the shift solenoid is energized (e.g., or a hydraulic/pneumatic piston is activated), pivoting the shift linkage, translating the spline coupling and engaging the axial coupling.

At 516, optionally, a determination is made whether the spline engaged successfully. This determination can be made using, for example, a spline position sensor, a plunger/solenoid position sensor, rotation sensors (e.g., detecting a differential rotational speed between now uncoupled shafts) or other sensor. If the spline has not yet engaged, process 500 can wait, or return to 514. In some implementations, a supply current to the shift solenoid can be increased, in an attempt to apply additional pivoting force to the shift linkage.

If the spline engages, at 518 a hold force is applied to a latch. For example, the hold solenoid is energized or a hydraulic/pneumatic piston is activated. The hold solenoid overcomes the latch bias, and engages the latch with the shift linkage.

At 520, the pivoting moment is removed. For example, the shift solenoid is de-energized, allowing the latch to be loaded and maintain the shift linkage in the engaged position. In some examples, a hydraulic/pneumatic piston is deactivated (e.g., vented) to remove the pivoting moment.

At 522, optionally, a second determination is made whether the spline has engaged successfully. If the engagement is successful process 500 proceeds to 510. If the engagement has not been successful, process 500 proceeds to 512.

Figure 6:
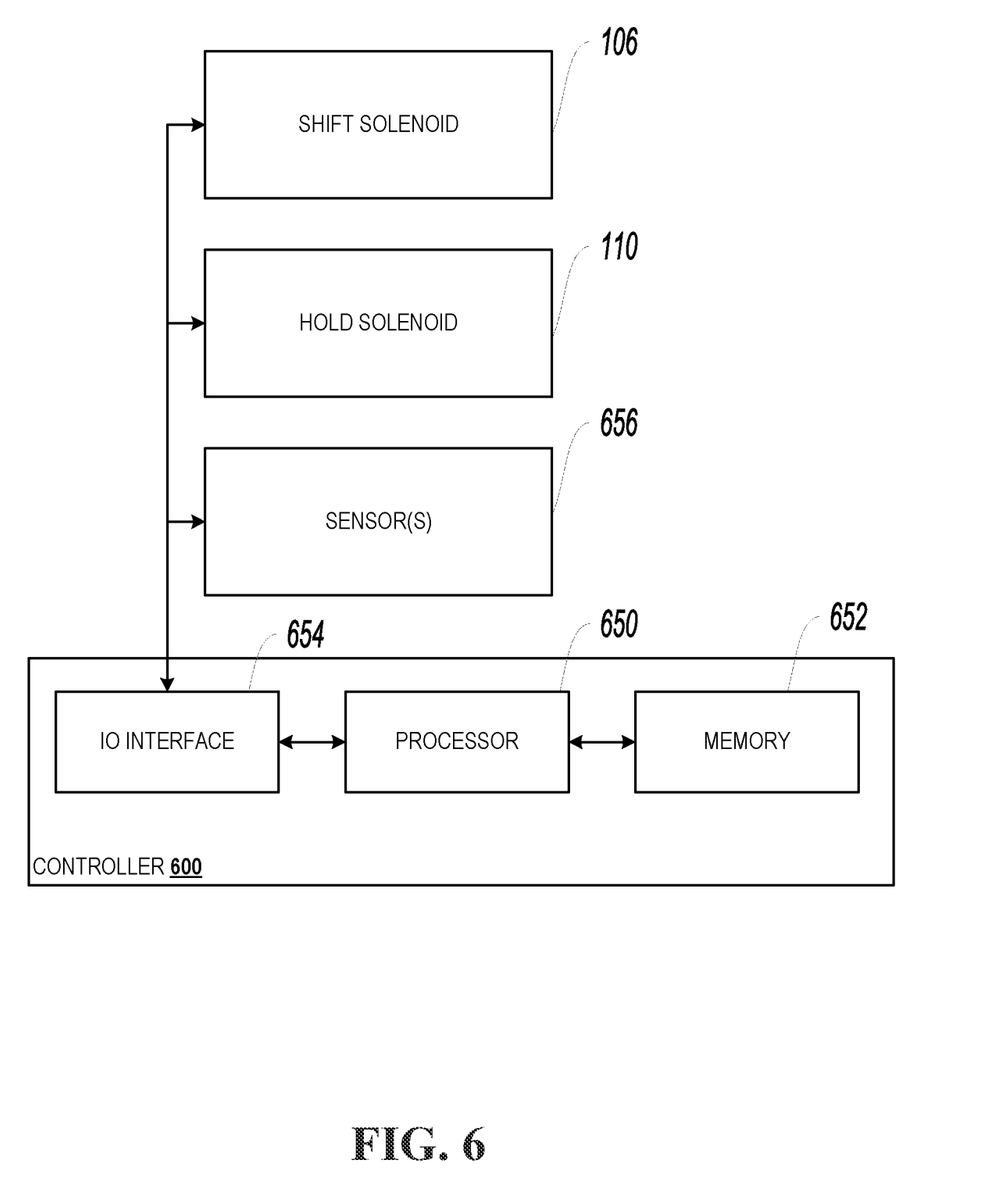
FIG. 6 is a block diagram of an example controller that can be used with aspects of this disclosure.

FIG. 6 is a block diagram of an example controller 600 that can be used with aspects of this disclosure. The controller 600 can, among other things, monitor parameters of the system and send signals to actuate and/or adjust various operating parameters of the system. As shown in FIG. 6, the controller 600, in certain instances, includes a processor 650 (e.g., implemented as one processor or multiple processors) and a memory 652 (e.g., implemented as one memory or multiple memories) containing instructions that cause the processors 650 to perform operations described herein. The processors 650 are coupled to an input/output (I/O) interface 654 for sending and receiving communications with components in the system, including, for example, solenoids 106 or 110. In certain instances, the controller 600 can additionally communicate status with and send actuation and/or control signals to one or more of the various system components (including an actuable system, axial coupler 100 of FIG. 1), as well as other sensors (e.g., a spline coupler position sensor, pressure sensors, torque sensors, rotational speed and/or position sensors, and other types of sensors 656). In certain instances, the controller 600 can communicate status and send actuation and control signals to one or more of the components within a vehicle in which the axial coupling is installed, such as a heads-up display, ECU, vehicle controller, etc. The communications can be hard-wired, pneumatic, hydraulic, wireless, or a combination. In some implementations, the controller 600 can be a distributed controller with different portions located throughout the vehicle. For example, in certain instances, the controller 600 can be a motor control unit, or it can be a separate controller apart from the motor control unit. Additional controllers can be used throughout the vehicle as stand-alone controllers or networked controllers without departing from this disclosure.

The controller 600 can have varying levels of autonomy for controlling the axial coupling 100. For example, the controller 600 can begin sensing a vehicle parameter, such as wheel acceleration, and an operator actuates axial coupling 100, by the controller, in response. Alternatively, the controller 600 can begin sensing the vehicle parameter and actuate axial coupling 100 with no input from an operator.

In some implementations, the controller 600 receives the input from a solenoid position sensor and an input from a spline position sensor. Based on the received inputs, the controller 600 determines the position of the cam. In some implementations, the controller determines a stalled actuation has occurred based on solenoid positions and spline position signals. More specifically, the controller makes such a determination based on a disagreement in these signals. In some implementations, the controller begins thermal management of the solenoids 106 and/or 110 responsive to the determined stall condition. Such thermal management can include reducing a duty cycle of the solenoid or solenoid operation for a set period of time. In some implementations, additional sensors, such as current sensors and thermal sensors, are also used to determine a state of an electric motor. In such instances, the controller is capable of adjusting the thermal management based in part on these additional inputs.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. An axial coupling comprising:
a shift linkage comprising a first end and a second end, the shift linkage configured to pivot between a first position and a second position;
a first solenoid affixed to the first end of the shift linkage, wherein actuating the first solenoid pivots the shift linkage between the first and second positions;
a latch configured to engage with the shift linkage retaining the shift linkage in the first position when engaged; and
a second solenoid positioned to contact the latch, wherein the second solenoid, when energized, is configured to pivot the latch into and maintain the latch in an engaged position.

2. The coupling of claim 1, wherein the latch is biased to a disengaged position.

3. The coupling of claim 2, wherein the latch is at least one of spring biased, or magnetically biased.

4. The coupling of claim 1, wherein the first solenoid is affixed to the first end of the shift linkage by a rocker linkage, wherein movement of a plunger of the first solenoid in a first direction causes the rocker linkage to pivot about a pivot point and move a strut that is coupled to the shift linkage in a second direction.

5. The coupling of claim 1, wherein the shift linkage is a forked linkage, and wherein the first end is a control end, and a second end is a forked end, and wherein when the shift linkage pivots, the forked end translates a spline coupling, and wherein the spline coupling causes the axial coupling to engage when the shift linkage is in the second position, and to disengage when the shift linkage is in the first position.

6. The coupling of claim 1, wherein the latch comprises a roller configured to reduce friction between the latch and the shift linkage.

7. The coupling of claim 1, comprising a housing enclosing the shift linkage, first solenoid, latch, and second solenoid.

8. The coupling of claim 7, wherein the first solenoid and the second solenoid are thermally coupled to the housing, and wherein heat generated in the first solenoid and the second solenoid is transmitted into the housing.

9. A method for actuating the axial coupling of claim 1, the method comprising:
controlling the first solenoid to apply a pivoting moment to the shift linkage, thereby, urging the shift linkage toward an engaged position;
controlling the second solenoid to remove a holding force from the latch, thereby, allowing the latch to move, under a bias force, to an unlatched position; and
controlling the first solenoid to remove the pivoting moment from the shift linkage allowing the shift linkage to pivot into a disengaged position.

10. The method of claim 9, wherein the shift linkage is biased to pivot toward the disengaged position.

11. The method of claim 10, wherein the shift linkage is biased using a spring or a magnet.

12. The method of claim 9, wherein applying the pivoting moment to the shift linkage toward the engaged position reduces a pressure between the latch and the shift linkage.

13. The method of claim 9, wherein the shift linkage comprises a forked end, and wherein the shift linkage pivoting to a disengaged position causes the forked end of the shift linkage to translate a spline coupling in a first direction, and wherein translating the spline coupling in the first direction causes the axial coupling to disengage.

14. A method for actuating the axial of claim 1, the method comprising:
controlling the first solenoid to apply pivoting moment to the shift linkage to pivot the shift linkage into an engaged position;
controlling the second solenoid to apply a holding force to the latch, against a bias force, to engage with the shift linkage; and
removing the pivoting moment from the shift linkage.

15. An axial coupling comprising:
a shift linkage comprising a first end and a second end, the shift linkage configured to pivot between a first position and a second position;
a first actuator affixed to the first end of the shift linkage, the first actuator comprising a first reciprocating element and configured to apply a linear force to the shift linkage through the first reciprocating element, wherein actuating the first actuator pivots the shift linkage between the first and second positions;
a latch configured to engage with the shift linkage retaining the shift linkage in the first position when engaged; and
a second actuator comprising a second reciprocating element which is positioned to contact the latch, the second actuator configured to apply a linear force to the latch through the second reciprocating element to pivot the latch into and maintain the latch in an engaged position.

16. The coupling of claim 15, wherein the first actuator is a solenoid and the first reciprocating element is a plunger.

17. The coupling of claim 15, wherein the first actuator is a hydraulic actuator and the first reciprocating element is a piston.

18. The coupling of claim 15, wherein the first actuator is a pneumatic actuator and the first reciprocating element is a piston.

19. The coupling of claim 15, wherein the latch is biased to a disengaged position.

20. The coupling of claim 19, wherein the latch is at least one of spring biased, or magnetically biased.

21. The coupling of claim 15, wherein the shift linkage is a forked linkage, and wherein the first end is a control end, and a second end is a forked end, and wherein when the shift linkage pivots, the forked end translates a spline coupling, and wherein the spline coupling causes the axial coupling to engage when the shift linkage is in the second position, and to disengage when the shift linkage is in the first position.

22. The coupling of claim 15, wherein the latch comprises a roller configured to reduce friction between the latch and the shift linkage.

23. The coupling of claim 15, comprising a housing enclosing the shift linkage and the latch, wherein the first means and the second means are thermally coupled to the housing, and wherein heat generated in the first and second means is transmitted into the housing.

\* \* \* \* \*